United States Patent
Wilske et al.

(10) Patent No.: US 10,421,481 B2
(45) Date of Patent: Sep. 24, 2019

(54) UTILITY VEHICLE STEERING SYSTEM

(71) Applicant: VOLKSWAGEN AKTIENGESELLSCHAFT, Wolfsburg (DE)

(72) Inventors: Ernst Wilske, Nedlitz (DE); Jens Rogall, Wolfsburg (DE); Stefan Blumberg, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 9 days.

(21) Appl. No.: 15/758,205

(22) PCT Filed: Aug. 22, 2016

(86) PCT No.: PCT/EP2016/069763
§ 371 (c)(1),
(2) Date: Mar. 7, 2018

(87) PCT Pub. No.: WO2017/042020
PCT Pub. Date: Mar. 16, 2017

(65) Prior Publication Data
US 2018/0244303 A1    Aug. 30, 2018

(30) Foreign Application Priority Data

Sep. 7, 2015 (DE) .................. 10 2015 217 045

(51) Int. Cl.
*B62D 5/04* (2006.01)
(52) U.S. Cl.
CPC ......... *B62D 5/0424* (2013.01); *B62D 5/0403* (2013.01); *B62D 5/0421* (2013.01); *B62D 5/0427* (2013.01); *B62D 5/0445* (2013.01)

(58) Field of Classification Search
CPC ...... B62D 5/00; B62D 5/0403; B62D 5/0421; B62D 5/0424; B62D 5/0427
(Continued)

(56) References Cited

U.S. PATENT DOCUMENTS

| 5,267,625 A | 12/1993 | Shimizu |
| 7,832,996 B2 | 11/2010 | Eisenmann |

(Continued)

FOREIGN PATENT DOCUMENTS

| CN | 1647984 A | 8/2005 |
| CN | 203363012 U | 12/2013 |

(Continued)

*Primary Examiner* — Tony H Winner
(74) *Attorney, Agent, or Firm* — Laurence A. Greenberg; Werner H. Stemer; Ralph E. Locher

(57) ABSTRACT

A utility vehicle steering system includes a steering gear for transmitting a manual torque from a steering wheel to a steering drop arm. An electric motor provides an auxiliary torque for the steering boost, which is provided exclusively electrically over the entire operating range of the steering system. An input shaft and an output shaft have axes of rotation that are skewed with respect to each other. A first gear device couples the input shaft to the output shaft. A second gear device has the electric motor connected to the input side and has at least one speed-reduction gear stage in the form of a coaxial gear with a high transmission ratio. The output side of the second gear device is coupled to the output shaft and its speed reduction gear stage, a coaxial gear with a high transmission ratio, is coaxial with the output shaft.

20 Claims, 12 Drawing Sheets

Figure 1:
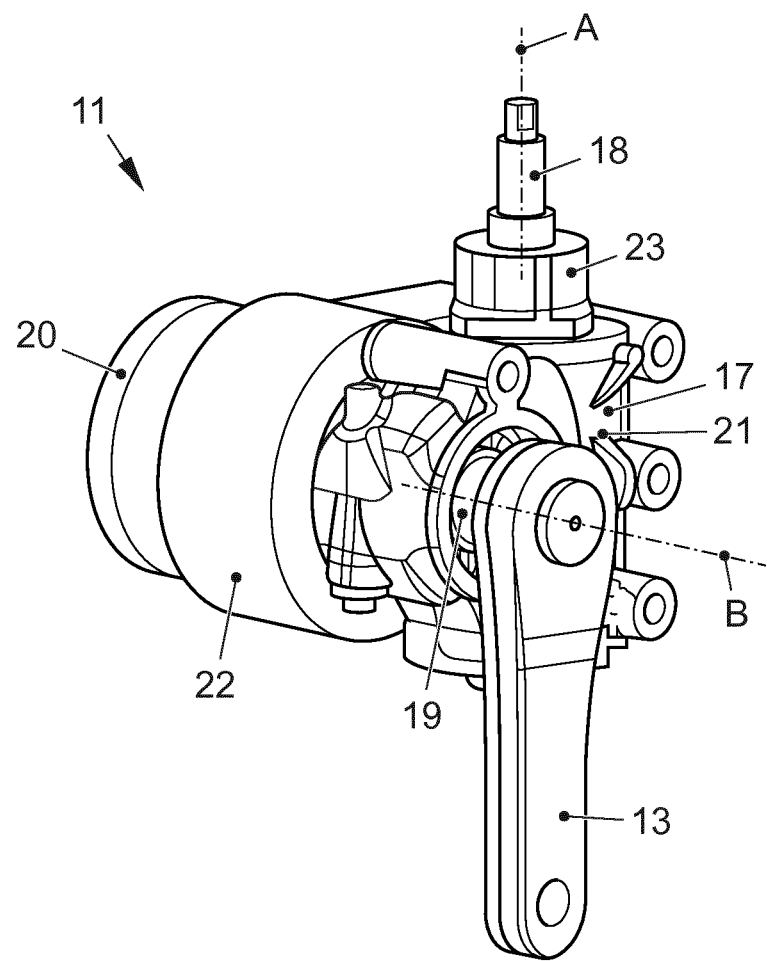

(58) Field of Classification Search
USPC .......................................................... 180/444
See application file for complete search history.

(56) References Cited

U.S. PATENT DOCUMENTS

| | | | |
|---|---|---|---|
| 8,157,691 B2 | 4/2012 | Stanovskoy et al. | |
| 8,360,197 B2 | 1/2013 | Escobedo et al. | |
| 8,864,154 B2 | 10/2014 | Freund et al. | |
| 2012/0241244 A1* | 9/2012 | Escobedo | B62D 3/08 180/444 |
| 2013/0032430 A1 | 2/2013 | Zaloga et al. | |
| 2014/0157922 A1* | 6/2014 | Schneider | B62D 3/08 74/89.34 |
| 2014/0290432 A1* | 10/2014 | Murakami | B62D 3/02 74/99 R |
| 2014/0311263 A1 | 10/2014 | Washnock et al. | |
| 2016/0053871 A1 | 2/2016 | Fecko | |
| 2017/0356544 A1* | 12/2017 | Lee | F16H 61/0213 |

FOREIGN PATENT DOCUMENTS

| | | |
|---|---|---|
| CN | 203703037 U | 7/2014 |
| DE | 4236771 A1 | 5/1993 |
| DE | 10039574 A1 | 2/2002 |
| DE | 10234596 B3 | 1/2004 |
| DE | 102004048196 A1 | 4/2006 |
| DE | 102004048197 A1 | 4/2006 |
| DE | 2004021588 U1 | 4/2009 |
| DE | 102010053581 A1 | 6/2012 |
| DE | 102012204318 A1 | 9/2012 |
| DE | 102011051531 A1 | 1/2013 |
| DE | 102012210169 A1 | 12/2013 |
| DE | 202014101670 U1 | 7/2014 |
| EP | 1354787 A2 | 10/2003 |
| EP | 2177788A A1 | 4/2010 |
| EP | 1776525 B1 | 8/2013 |
| WO | 2006034921 A1 | 4/2006 |
| WO | 2014154340 A1 | 10/2014 |

* cited by examiner

UTILITY VEHICLE STEERING SYSTEM

BACKGROUND OF THE INVENTION

Field of the Invention

The invention relates to a utility vehicle steering system, comprising a steering gear for transmitting a manual torque applied to a steering wheel to a steering pitman arm, which steering gear has an electric motor for providing an auxiliary torque for steering assistance, wherein the steering assistance is provided exclusively electrically over the entire operating range of the steering system.

Utility vehicle steering systems must, by contrast to steering systems for passenger motor vehicles, provide considerably higher steering forces owing to the higher front axle loads, such that steering system concepts that are conventional for passenger motor vehicles cannot be transferred to utility vehicles. Furthermore, owing to the different spatial conditions in the vehicle, there is a considerably changed installation situation.

Utility vehicle steering systems are therefore often configured with a block-like steering gear, to the output side of which there is connected a steering pitman arm. A manual torque input into the steering gear at the input side by the driver is converted by said steering gear into a pivoting movement of the steering pitman arm.

DE 20 2004 021 588 U1 discloses a utility vehicle steering system which has both an electrical power assistance means and a hydraulic power assistance means. The manual torque input by the driver is in this case introduced via a torsion bar into a spindle which engages, via an endless ball chain, with an axially displaceable piston. A toothing provided on the outer circumference of the piston meshes with a drive-output segmented shaft which is connected to the steering pitman arm for the purposes of converting the axial movement of the piston into a pivoting movement of the steering pitman arm. The torsion bar arranged within the spindle actuates, by means of a rotary slide, a valve arrangement of a hydraulic circuit. The hydraulic circuit generates a hydraulic pressure by means of a pump and acts on the piston, which provides an assistance force in addition to the manual torque. The electric power assistance is provided by means of an electric motor which is coupled to the spindle via a harmonic drive. Here, the electric motor is seated at the outside on a steering gear housing upstream of the spindle.

Considering an on-board electrical system voltage of 24 V, such as is common in the utility vehicle sector, such electric motors conventionally generate a drive torque of 2 Nm, such that, considering a gear transmission ratio of the harmonic drive of i=50, a torque of around 100 Nm can be obtained. By contrast, the hydraulic component of the power assistance corresponds to a much higher torque of approximately 7600 Nm.

A utility vehicle steering system of said type is of complex construction owing to the ball screw drive and the required hydraulic system. Furthermore, the hydraulic system gives rise to a considerable structural space requirement.

As discussed in DE 20 2004 021 588 U1, a permanently operationally ready hydraulic power assistance means requires a power of approximately 1000 W, which is manifest in corresponding additional fuel consumption. In DE 20 2004 021 588 U1, as a remedial solution, it is proposed that the hydraulic power assistance means be deactivated in certain situations such that only the electrical power assistance means is used. Only if relatively high steering forces are required is the hydraulic power assistance means activated.

Furthermore, DE 100 39 574 A1 discloses a utility vehicle steering system of the type mentioned in the introduction with purely electric power assistance. In this way, the outlay for an additional hydraulic system is avoided. For the purposes of redundancy, the utility vehicle steering system according to DE 100 39 574 A1 is equipped with two electric motors, which in turn gives rise to an increased structural space requirement and manufacturing outlay.

The present invention is based on the object of further developing a utility vehicle steering system of the type mentioned in the introduction, maintaining high steering forces and a compact design with regard to reduced outlay in terms of construction. Here, it is sought for an overall torque approximately similar to that in DE 20 2004 021 588 U1 to be provided at the steering pitman arm.

SUMMARY OF THE INVENTION

Said object is achieved by means of a utility vehicle steering system as claimed. The utility vehicle steering system according to the invention comprises a steering gear for transmitting a manual torque applied to a steering wheel to a steering pitman arm, which steering gear has the following:
- an electric motor for providing an auxiliary torque for steering assistance, wherein the steering assistance is provided exclusively electrically over the entire operating range of the steering system,
- an input shaft and an output shaft, the axes of rotation of which are skewed relative to one another,
- a first gear device which couples the input shaft to the output shaft, and
- a second gear device, to the input side of which the electric motor is connected and which has at least one speed reduction gear stage in the form of a high-ratio coaxial gear, wherein the second gear device is coupled at the output side to the output shaft, and its speed reduction gear stage in the form of the high-ratio coaxial gear is arranged coaxially with respect to the output shaft.

It has been found that, with such an arrangement, a particularly compact utility vehicle steering arrangement can be realized which permits the provision of high torques by means of an electromotive drive in a restricted structural space.

The utility vehicle steering system according to the invention is suitable in particular for non-rail-bound motor vehicles with front-axle loads of greater than 2.5 t.

The power assistance is realized purely electrically, such that no hydraulic components are required. Here, with the presently customary on-board electrical system voltage of 24 V, torques in the range of approximately 8000 Nm are provided at the steering pitman arm. Via the steering pitman arm, the steering commands are transmitted from the steering gear for example via a track rod linkage to the pivot bearings of the steered wheels.

Further refinements of the invention are specified in the patent claims.

The gear stage, which is coaxial with respect to the output shaft, of the second gear device is preferably an eccentric gear with toothing, an eccentric gear with involute toothing, or a cycloid gear. In this way, with compact dimensions, very high transmission ratios can be realized, such that, in the second gear device, an overall transmission ratio of greater than 1:320 can be realized with a small number of gear stages. It is particularly advantageous here if a cam disk gear is used as the cycloid gear.

Owing to the restricted possibility of miniaturisation of the rollers, cycloid gears are still relatively large if high transmission ratios up to approximately 1:100 are required in a single-stage configuration. Eccentric gears with involute toothing offer additional advantages here. The toothing exhibits an aerial load-bearing action in the case of small differences in numbers of teeth. Furthermore, the load is borne by a relatively large number of teeth simultaneously.

In one design variant, the second gear device has two gear stages which are each formed as speed reduction gear stages in the form of a high-ratio coaxial gear. In this way, an overall transmission ratio of greater than 1:320 can be realized by means of very compact gear stages.

Here, it is preferable for both gear stages of the second gear device to be formed either as a single-stage eccentric gear or as a single-stage cycloid gear. Furthermore, for both gear stages, there may be provided a common ring gear wheel with which the inner discs of both gear stages respectively mesh. In this way, a further reduction in the structural space of the second gear device is achieved.

Furthermore, both gear stages of the second gear device may have an identical or approximately identical single-stage transmission ratio, in each case in the range from 1:18 to 1:25. This is expedient from a spatial aspect, in particular in the case of the two gear stages being positioned axially directly one behind the other, and with regard to the generation of noise.

In a further design variant, the electric motor is arranged coaxially with respect to the output shaft. Said electric motor can thus be highly advantageously combined to form a structural unit with the second gear device or with at least one gear stage thereof.

In a further design variant, the second gear device has, between the electric motor and the high-ratio coaxial gear, a gear stage in the form of a speed reduction belt drive, planetary gear, bevel-wheel gear or hypoid gear. In this way, it is possible for the position of the electric motor to be adapted to the respective installation situation. Accordingly, said electric motor may in particular also be arranged axially parallel with respect to the output shaft or with its axis of rotation perpendicular to the axis of rotation of the output shaft. However, a spur wheel gear may also advantageously be used at this point.

Furthermore, the second gear device may be configured such that a or the additional gear stage between the electric motor and the high-ratio coaxial gear has a speed reduction transmission ratio of less than 1:8, whereas the high-ratio coaxial gear has a speed reduction transmission ratio greater than 1:60, such that an overall transmission ratio of greater than 1:320 is possible. A high-ratio coaxial gear may in this case still be of single-stage design in order to permit an axially particularly short design. Furthermore, here, for example in combination with a belt drive, the electric motor can be arranged in any desired manner around the output shaft, and fitted in a flexible manner into an existing structural space.

In a further design variant, a toothing structure as a constituent part of the first gear device is fastened or formed on the drive-output shaft, such that the auxiliary torque of the electric motor is combined with the manual torque from the steering wheel with little outlay.

In a further design variant, the first gear device has two gear stages, specifically a first gear stage for converting a rotational movement of the input shaft about its axis of rotation into a translational movement of an intermediate element, and a second gear stage for converting the translational movement of the intermediate element into a rotational movement of the output shaft about its axis of rotation, wherein the speed reduction transmission ratio of the first gear device lies in the range from 1:10 to 1:40.

In a further design variant, cylindrical boring bushes are arranged between drivers and openings of the inner disk of the eccentric or cycloid gear, which bushes replace or supplement the rolling bearings that are normally used here.

By contrast, in a further design variant, the first gear device is formed with exactly one gear stage, whereby said first gear device is considerably simplified in terms of manufacture and assembly. Said single gear stage converts a rotational movement of the input shaft about its axis of rotation into a rotational movement of the output shaft about its axis of rotation in a single-stage configuration.

A screw drive, a bevel-wheel gear or a hypoid gear are particularly suitable for this purpose, by means of which a rotational angle range of 900° at the input shaft can be reduced to a rotational angle range of approximately 45° to 90°, preferably 45° to 60°, at the output shaft and at the steering pitman arm. However, a ball screw drive may also advantageously be used at this point.

Furthermore, a torque sensor may be arranged on the input shaft at the input side, in order to detect the manual torque imparted by the driver and actuate the electric motor accordingly.

In a further design variant, a steering gear housing accommodates the input shaft, the output shaft, the first gear device and at least the high-ratio coaxial gear of the second gear device, resulting in a preassemblable structural unit, which can be installed as such on the vehicle.

Furthermore, the electric motor may likewise be incorporated into such a structural unit and, for this purpose, preferably accommodated in the steering gear housing.

It is furthermore possible for parts of the electric motor, such as for example the stator thereof, to be formed by sections of the steering gear housing, whereby the overall weight of the steering gear can be reduced.

The steering assistance is preferably provided exclusively by means of a single electric motor over the entire operating range of the steering system, such that considerable structural space advantages are achieved in relation to DE 100 39 574 A1.

Furthermore, the electric motor may have a stator with at least two electrical separate winding assemblies, which are in each case actuated by a dedicated electronic control device. In the case of a compact, high-speed electric motor being used, this permits an increase in the torque that is provided by the electric motor from the vehicle on-board electrical system.

In a further design variant, the gear stage via which the first gear device engages on the output shaft has a variable transmission ratio such that, in a range situated relatively close to the central position of the steering arrangement, steering movements at the steering wheel give rise to smaller wheel steer angles than steering movements in a range further remote from the central position. In this way, it is possible to realize large steering movements with a small wheel steer angle during straight-ahead travel and small steering movements with a large wheel steer angle during parking, in order to make the handling of the vehicle easier for the driver.

BRIEF DECRIPTION OF THE SEVERAL VIEWS OF THE DRAWING

Figure 2:
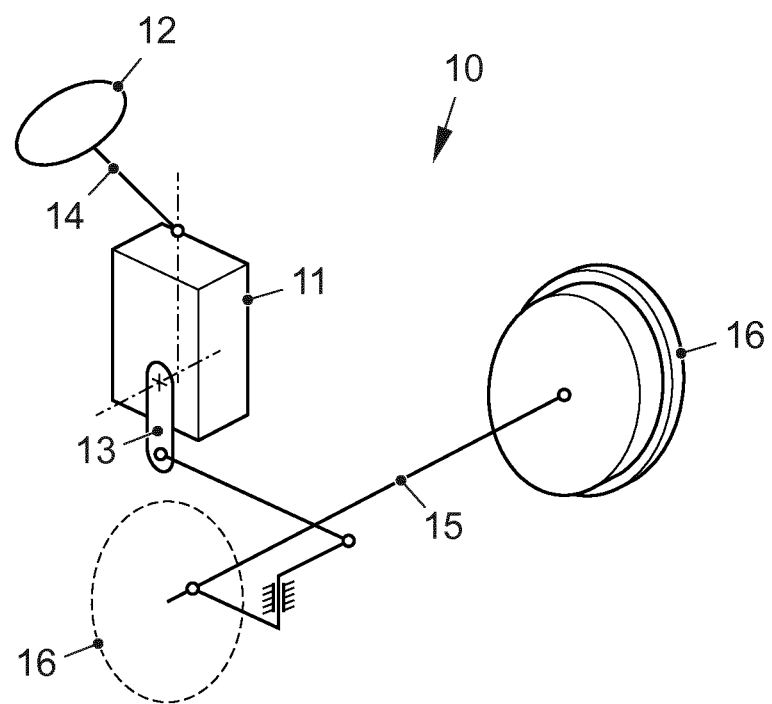
Figure 3:
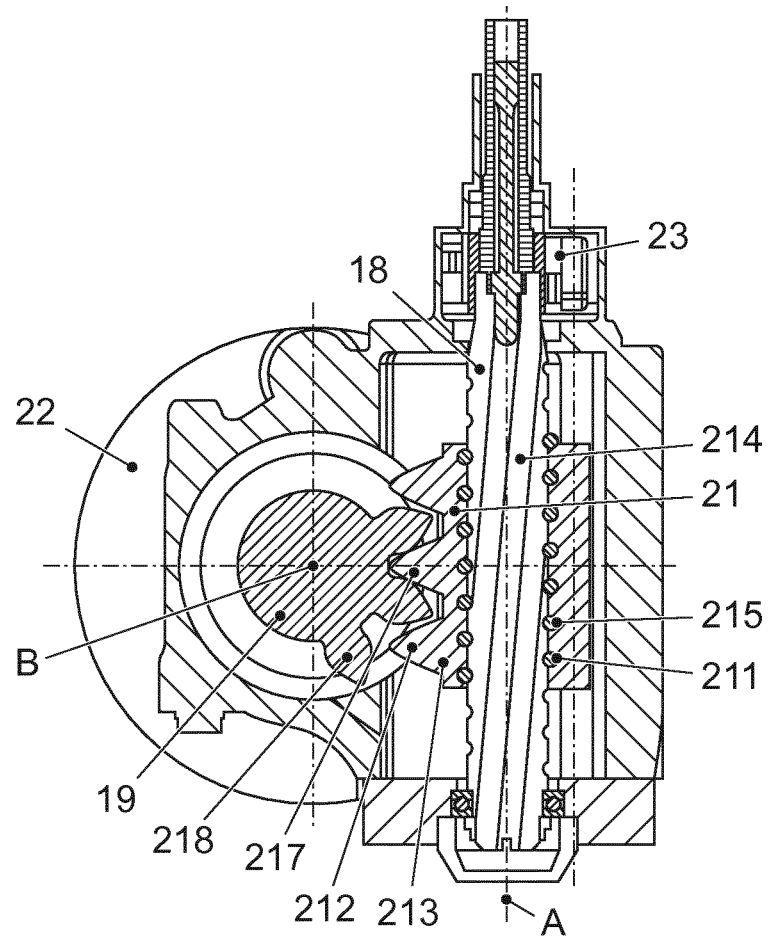
Figure 4:
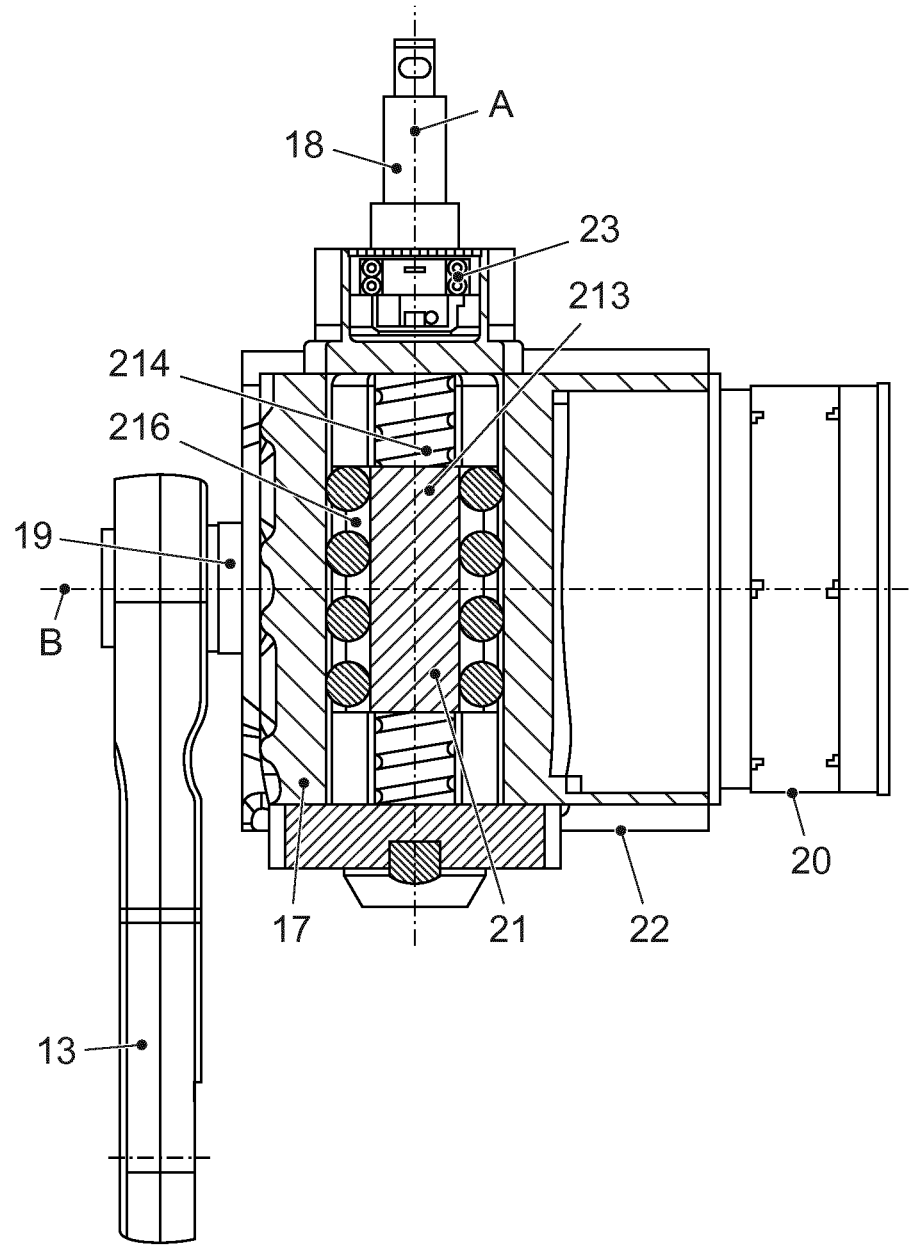
Figure 5:
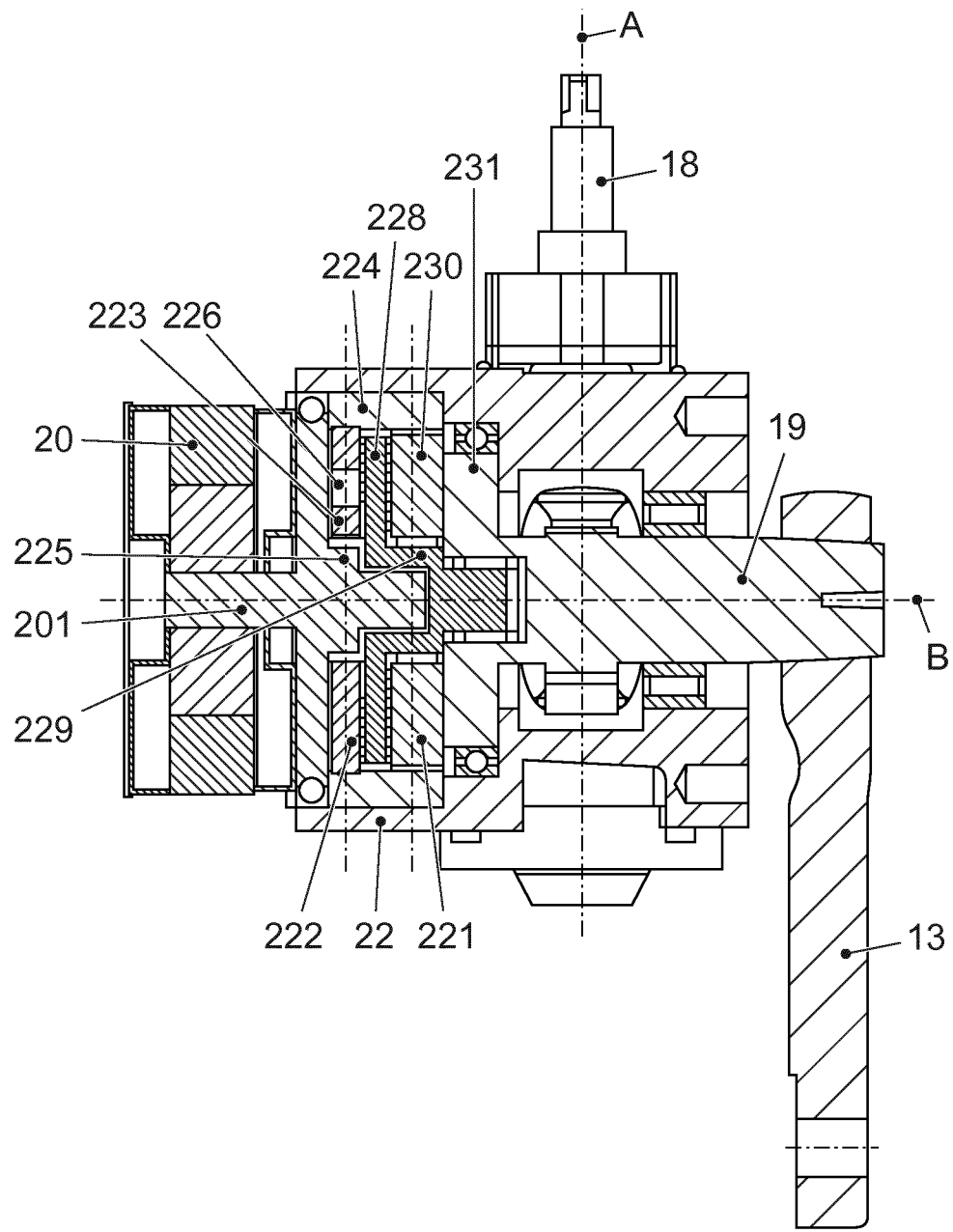
Figure 6:
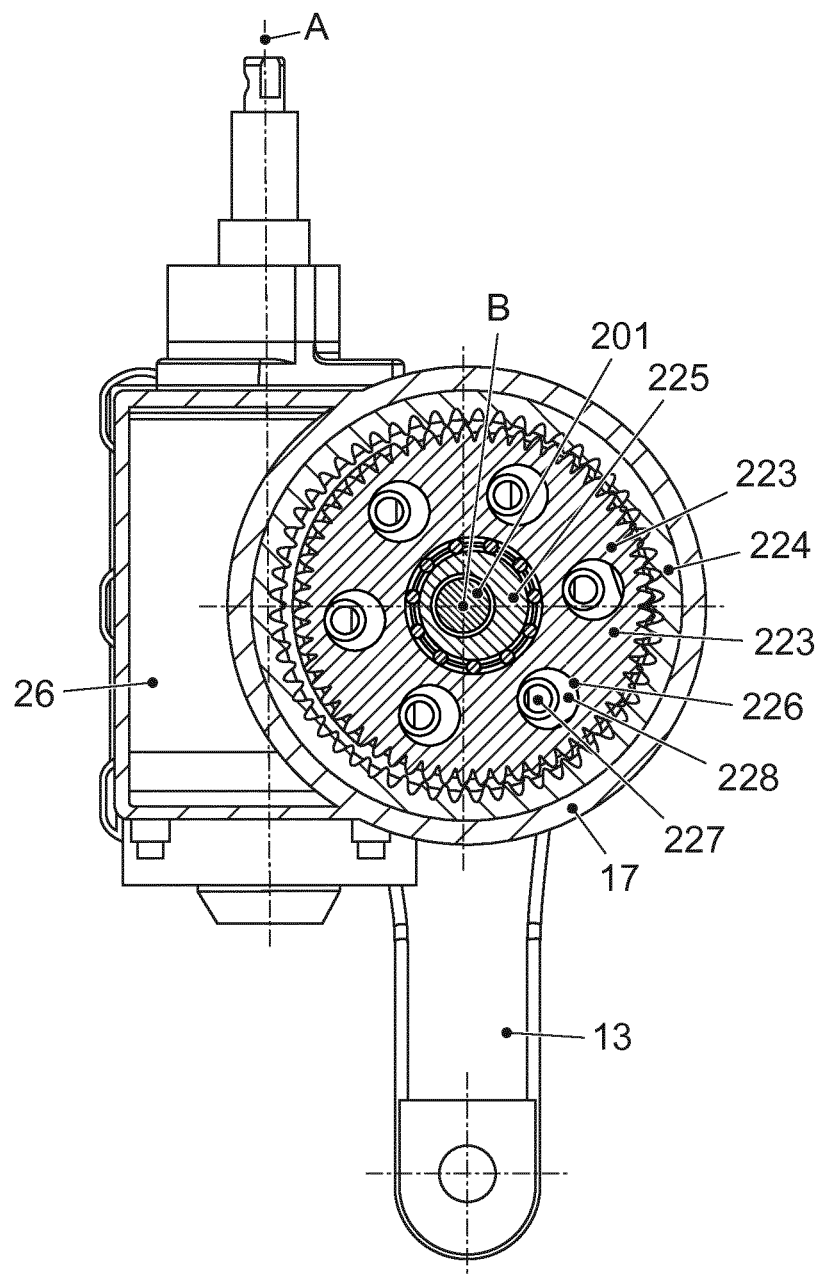
Figure 7:
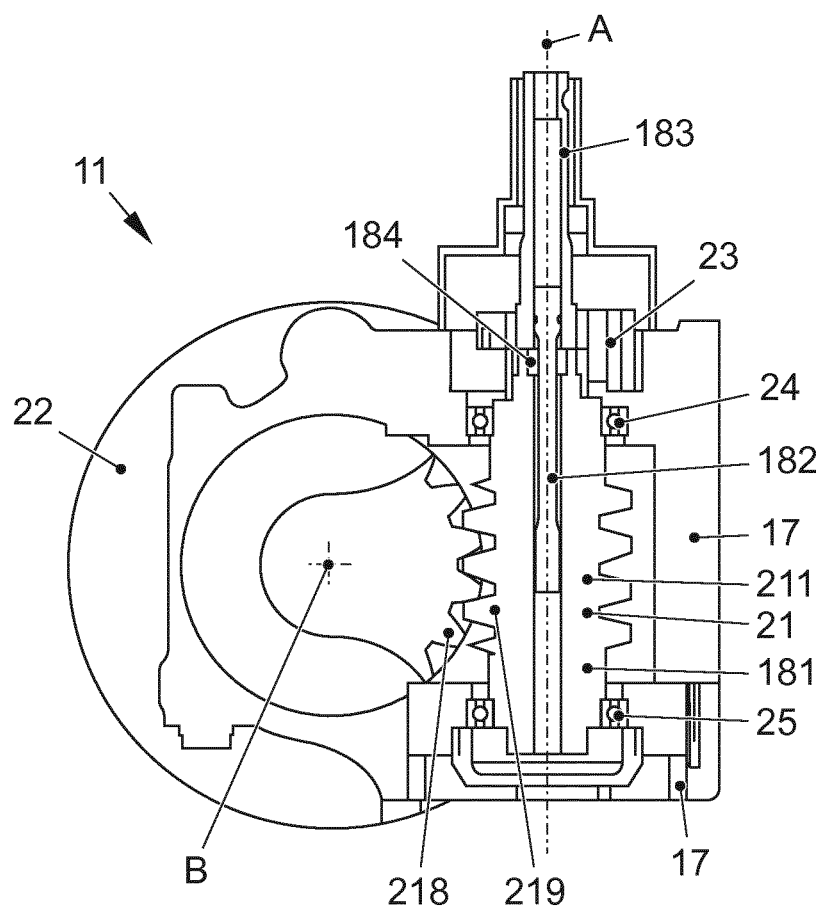
Figure 8:
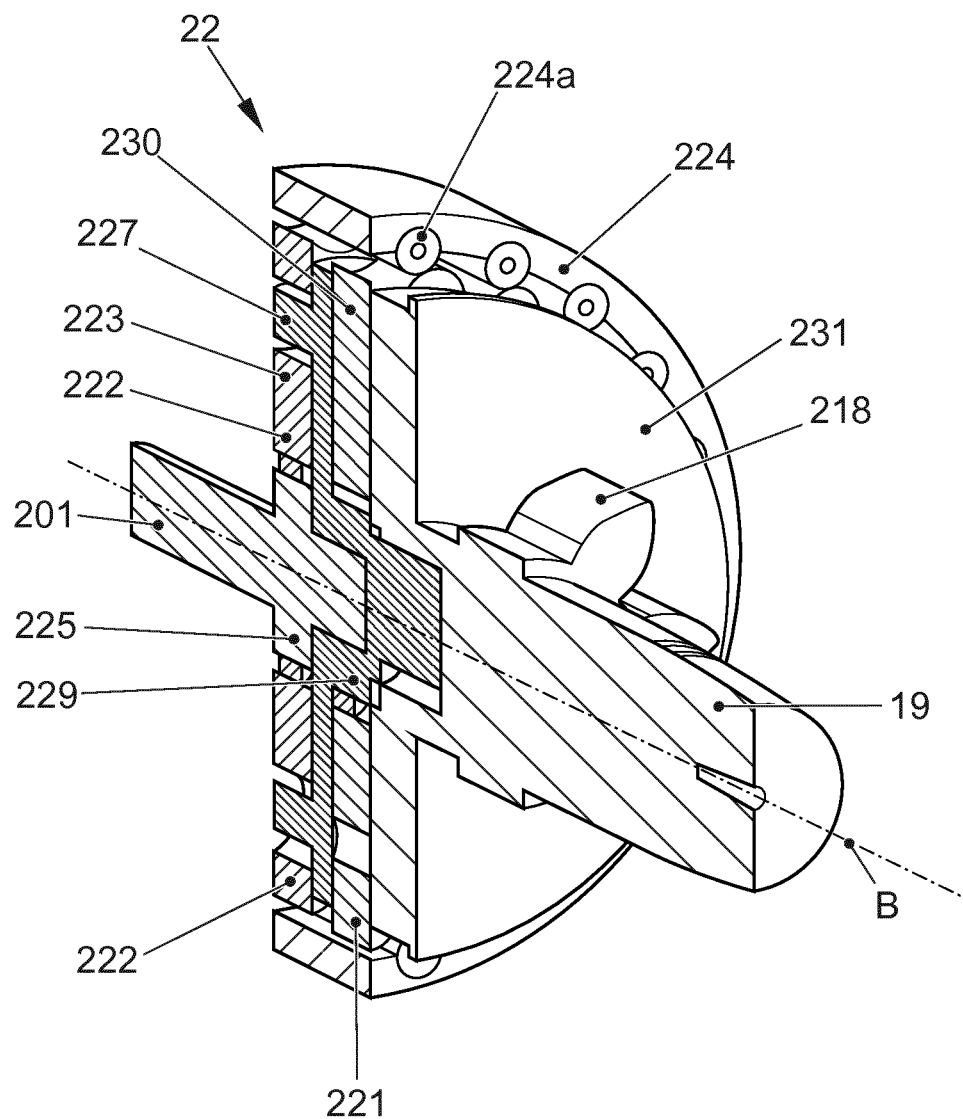
Figure 9:
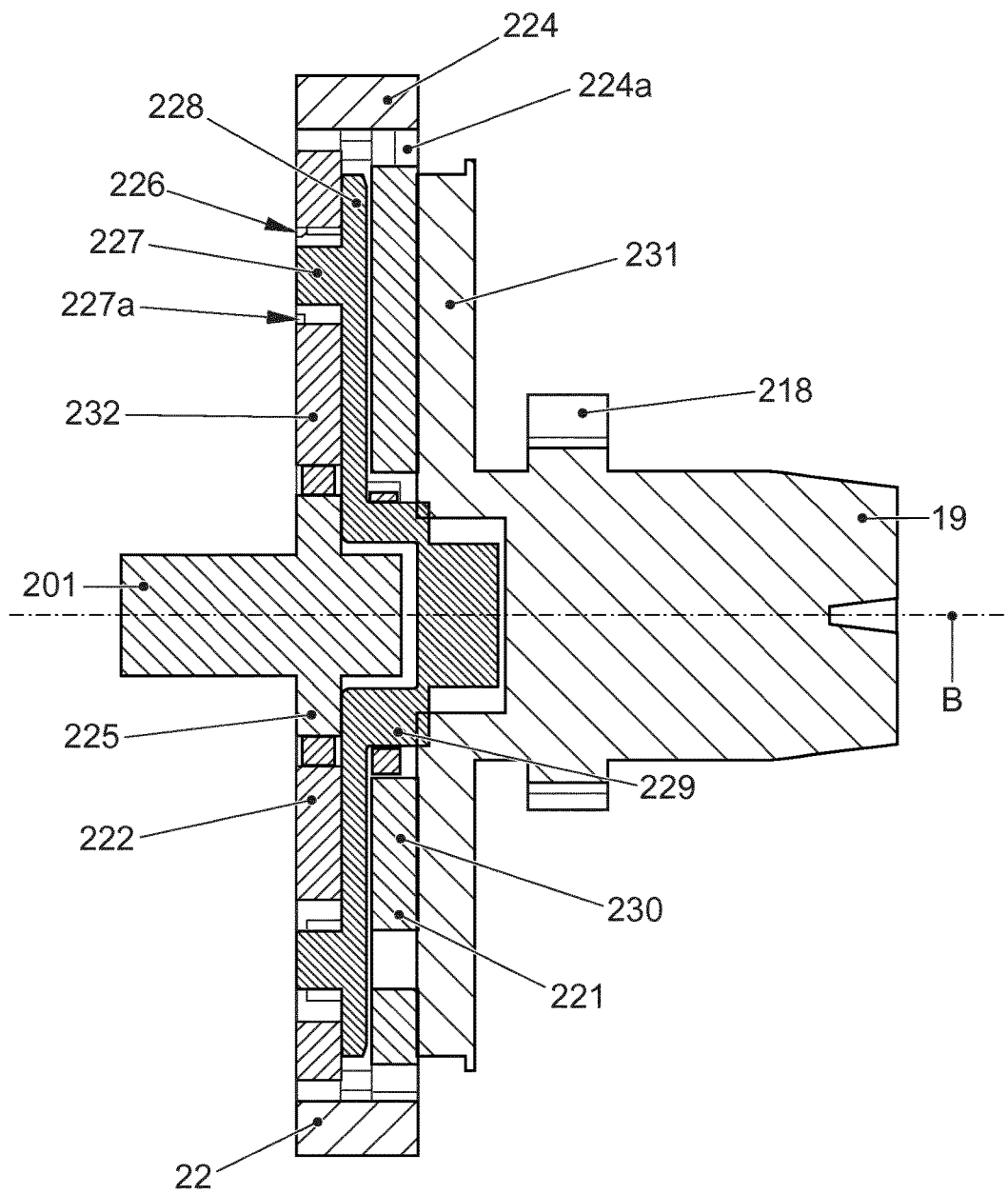
Figure 10:
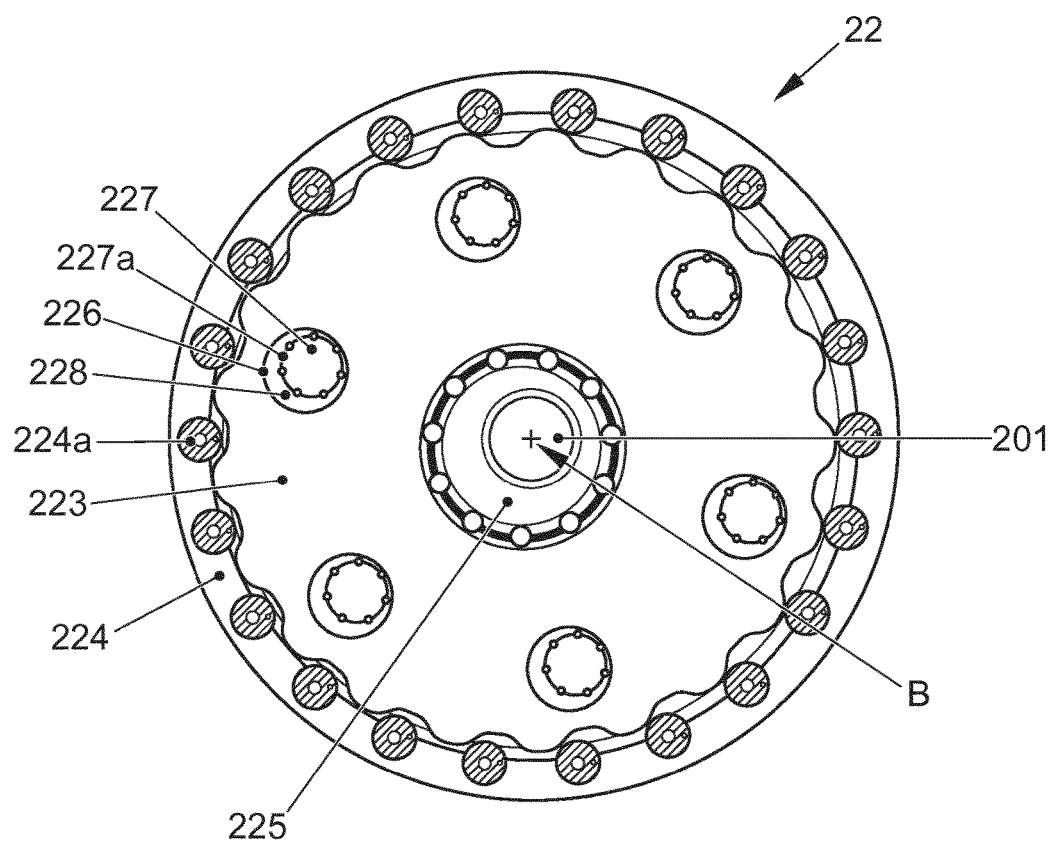
Figure 11:
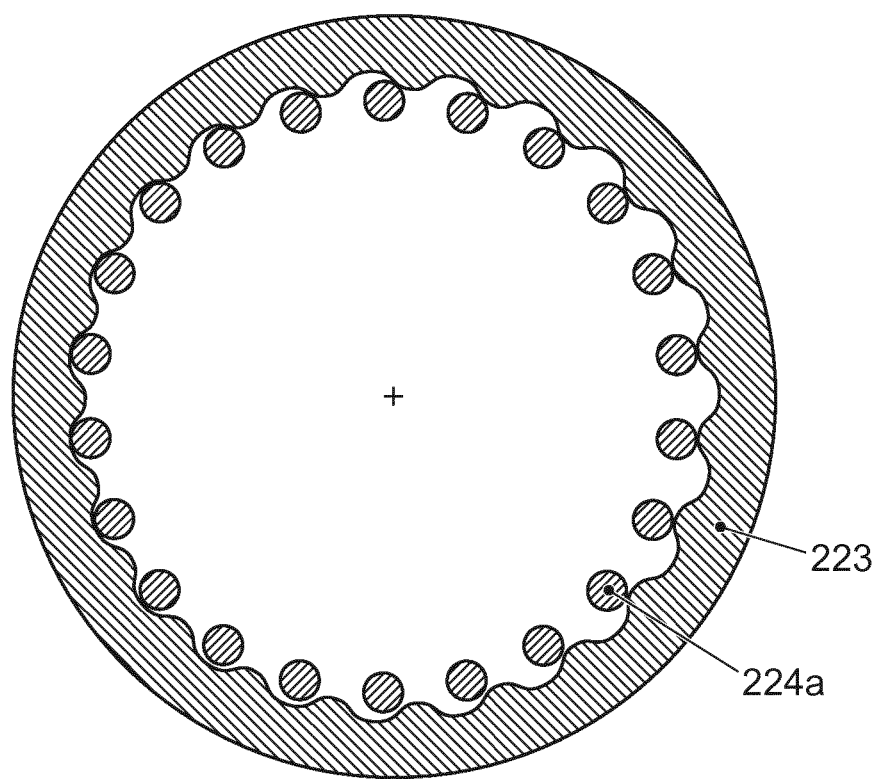
Figure 12:
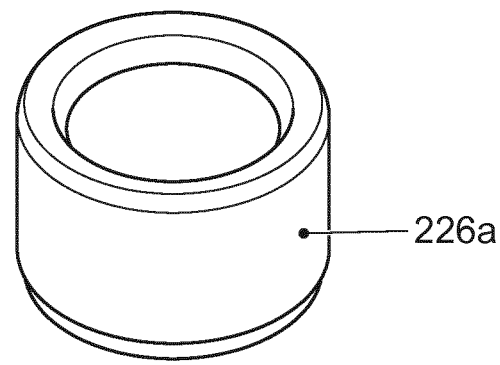
Figure 13:
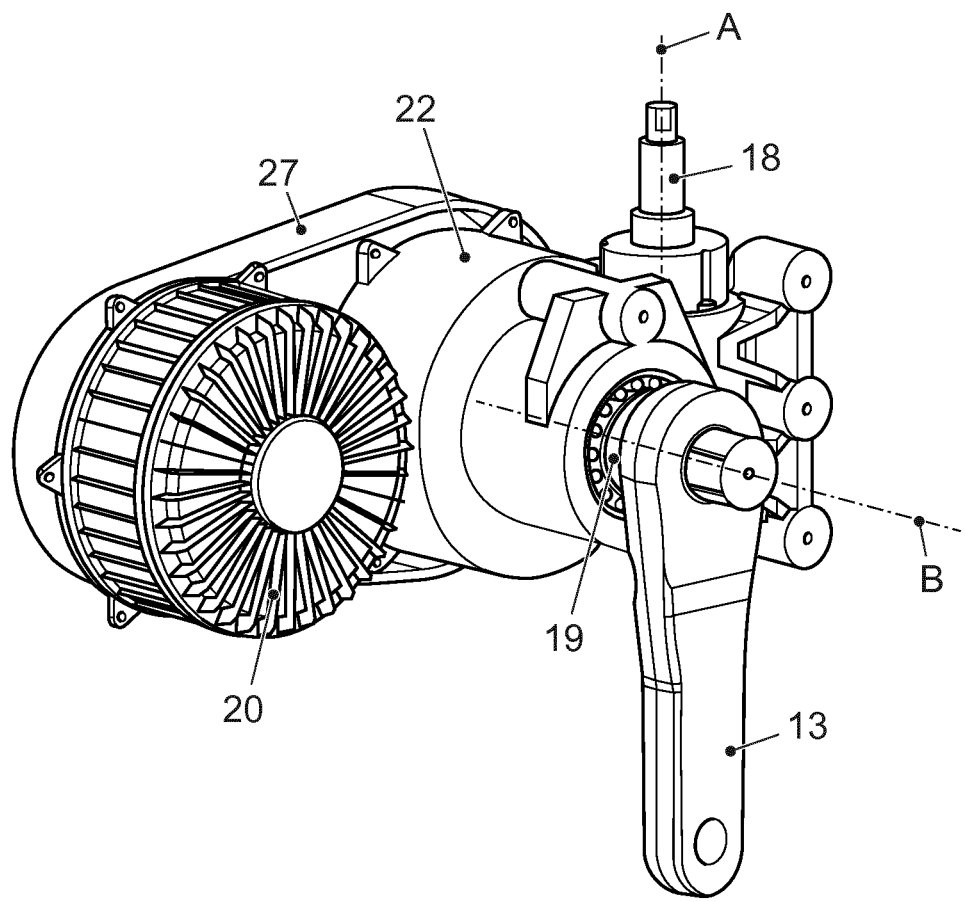

The invention will be discussed in more detail below on the basis of exemplary embodiments illustrated in the drawing, in which:

FIG. 1 shows a three-dimensional view of a first exemplary embodiment of a utility vehicle steering system according to the invention, FIG. 2 shows a schematic view of the arrangement of a utility vehicle steering system according to the invention on a utility vehicle, FIG. 3 shows a longitudinal sectional view of the steering gear of the first exemplary embodiment along its input shaft, FIG. 4 shows a further sectional view of the steering gear of the first exemplary embodiment, FIG. 5 shows a longitudinal sectional view of the steering gear of the first exemplary embodiment along its output shaft, FIG. 6 shows a cross-sectional view of the second gear device perpendicularly to the output shaft, FIG. 7 shows a view corresponding to FIG. 2 for a second exemplary embodiment FIG. 8 shows a three-dimensional partial view of a further embodiment of the second gear device of a third exemplary embodiment, FIG. 9 shows a longitudinal sectional view through the second gear device as per FIG. 8, FIG. 10 shows a cross-sectional view of the second gear device as per FIG. 8, FIG. 11 shows an alternative design with a hypocycloid, FIG. 12 shows a cylindrical boring bushing for the alternative mounting of the driver in an eccentric or cycloid gear, and FIG. 13 shows a fourth exemplary embodiment of a steering gear of a utility vehicle steering system according to the invention.

DESCRIPTION OF THE INVENTION

The exemplary embodiments each relate to a utility vehicle steering system 10 of a block steering system type, which is suitable for front-axle loads of 2.5 t and higher. FIG. 2 shows, in a schematic illustration, the arrangement thereof in a utility vehicle. The utility vehicle steering system 10 has a steering gear 11 which is intended and designed for transmitting a manual torque imparted by the driver at a steering wheel 12 to a steering pitman arm 13. For this purpose, the steering wheel 12 is coupled via a steering column 14 to an input element of the steering gear 11. The steering pitman arm 13, which is coupled to an output element of the steering gear 11, is connected for example via a track rod linkage 15 to the wheels 16, which are to be steered, of the motor vehicle, in order to transmit a pivoting movement of the steering pitman arm 13 to the wheels 16 and thus effect a steer angle at said wheels.

The steering gear 11 of the first exemplary embodiment, the construction of which is illustrated in more detail in FIGS. 1 and 3 to 6, comprises a steering gear housing 17, in which an input shaft 18 and an output shaft 19 are mounted so as to be rotatable about axes of rotation A and B. The manual torque of the driver is input into the steering gear 11 via the input shaft 18, whereas the output shaft 19 is coupled rotationally conjointly to the steering pitman arm 13, in order to pivot the latter and thus steer the vehicle wheels 16 via the track rod linkage 15. The axis of rotation B of the output shaft 19 runs in this case in a skewed manner with respect to the axis of rotation A of the input shaft 18. Two axes or straight lines which neither intersect nor are parallel to one another are termed "skewed".

The steering gear 11 furthermore comprises an electric motor 20 for providing an auxiliary torque for steering assistance for the driver. In the steering system type according to the invention, the steering assistance is realized preferably exclusively electrically over the entire operating range of the steering system. In particular, a hydraulic steering assistance means can be omitted.

The steering gear 11 furthermore comprises two gear devices, a first gear device 21 which couples the input shaft 18 to the output shaft 19, and a second gear device 22, to the input side of which the electric motor 20 is connected and which is coupled at the output side to the output shaft 19. The manual torque is thus caused to act with the transmission ratio of the first gear device 21, and the drive torque of the electric motor 20 is caused to act with the transmission ratio of the second gear device 22, on the output shaft 19 and thus on the steering pitman arm 13. Here, both gear devices 21 and 22 each realize a speed reduction transmission ratio.

As has already been discussed above, in a utility vehicle steering system, a torque of approximately 8000 Nm is required at the steering pitman arm in order to permit good handling of the vehicle in all driving situations in the case of high front axle loads, in particular also in the case of soft underlying surfaces. In principle, it is conceivable for this purpose to use an electric motor with a high drive-output torque. This would however lead to relatively large dimensions, and therefore such an approach appears less advantageous in the context of a vehicle steering system. The use of multiple electric motors, as proposed in DE 100 39 574 A1, also requires a large structural space. In practice, therefore, hydraulic drives have conventionally been provided for providing high steering forces.

The exemplary embodiments now follow a new path, which makes it possible for the auxiliary force to be provided by means of a single, relatively compact electric motor 20, wherein the structural space requirement of the steering gear 11 nevertheless remains small overall. The use of two compact electric motors is likewise not ruled out.

In this regard, various steering gear configurations will be proposed below. All of these have in common the fact that the second gear device 22 is coupled at the output side to the output shaft 19 and has at least one speed reduction gear stage 221 in the form of a high-ratio coaxial gear. Said speed reduction gear stage 221 in the form of a high-ratio coaxial gear is in the present case arranged coaxially with respect to the output shaft 19 in order to introduce the drive torque into the output shaft 19. Here, despite a very compact design, an overall speed reduction transmission ratio of greater than 1:320 is realized by means of the second gear device 22. Through the use of suitable gears, overall speed reduction transmission ratios of up to approximately 1:1600 are possible with two gear stages, without the dimensions of the second gear device 22 being excessively increased.

In the first exemplary embodiment, the second gear device 22 has two gear stages 221 and 222 arranged axially directly one behind the other, which are both designed as speed reduction gear stages in the form of a high-ratio coaxial gear. Here, the electric motor 20 is arranged coaxially with respect to the second gear device 22. The axis of rotation of said electric motor thus lies on the axis of rotation B of the drive-output shaft 19. This results in a very compact unit composed of electric motor 20 and second gear device 22.

To realize a high speed reduction transmission ratio, the gear stages 221 and 222 of the second gear device are formed as eccentric gears with a toothing, preferably as eccentric gears with an involute toothing, as can be clearly seen in FIGS. 5 and 6.

The high-ratio coaxial gear of the motor-side second gear stage 222 has at least one inner gearwheel 223 which, on its outer circumference, bears an involute toothing which partially meshes with a ring gearwheel 224 and can rotate in the ring gearwheel. The inner gearwheel is driven by 223 by a shaft shoulder 225 which is eccentric with respect to the drive-output shaft 201 of the electric motor 20, such that the inner gearwheel 223 rotates in the ring gearwheel 224. The inner gearwheel furthermore has multiple axial openings 226 into which drivers 227 of relatively small diameter of an output element 228 of the second gear stage 222 engage. If the electric motor 20 is set in operation in order to rotate its drive-output shaft, said drive-output shaft drives the inner gearwheel 223 concomitantly in the direction of rotation. Here, the inner gearwheel 223 rolls on the ring gearwheel 224. The openings 226 of the inner gearwheel 223 come into contact with the drivers 227 of the output element 228 and correspondingly drive these concomitantly, such that the output element 228 rotates about the axis of rotation B. In the case of a single-stage design of the second gear device 22, said output element 228 would directly drive the output shaft 19 of the steering gear 11. In the present case, however, a further gear stage, specifically the first gear stage 221, is incorporated, which in the exemplary embodiment is likewise an eccentric gear with involute toothing. Here, the output element 228 has an eccentric shaft shoulder 229 for driving the second inner gearwheel 230. The latter in turn meshes with the ring gearwheel 224 in order, by means of openings, to rotate drivers on the output element 231 of the first gear stage 221 about the axis of rotation B and thereby ultimately drive the output shaft 19. The output shaft may be formed as a disc-shaped carrier, from which the drivers project axially in the direction of the openings. Furthermore, the output element 231 may, as illustrated in the present case, be formed integrally with the output shaft 19, or else fastened or connected in some other way to such an output shaft.

In the design variant illustrated in FIGS. 5 and 6, the inner gearwheels 223 and 230 of the two gear stages 221 and 222 are designed and arranged such that only one common ring gearwheel 224 is required. Both gear stages may thus be designed with an identical or approximately identical transmission ratio, which may preferably be selected in each case in the range from 1:18 to 1:25 for a utility vehicle steering system. This is advantageous in particular with regard to a compact design.

It is however also possible for a dedicated ring gear to be provided for each gear stage 221, 222.

Furthermore, the second gear device 22 may have two mutually different high-pressure coaxial gears as gear stages. For example, one of the high-ratio coaxial gears may be designed as a cycloid gear, whereas the other is an eccentric gear.

It is also possible for the second gear device 22 to be of single-stage design, that is to say with only one gear stage.

In all cases, however, at least one high-ratio coaxial gear, be it an eccentric gear with involute toothing or a cycloid gear, is provided. In the present case, a "high-ratio coaxial gear" is to be understood to mean a gear with a high single-stage transmission ratio in the range from 1:15 to 1:400 and coaxial input and output elements.

It is furthermore possible for a gear stage 221 in the form of a high-ratio coaxial gear to be combined with a gear stage which has a relatively low transmission ratio. However, in this case, to provide adequate torques, is then necessary to use a high-ratio coaxial gear with a considerably increased transmission ratio in relation to the first exemplary embodiment.

If it were sought to achieve corresponding overall transmission ratios using planetary gears, a greater number of gear stages would be required. Furthermore, the overall length in the axial direction would be considerably increased. By contrast, harmonic drive gears, that is to say harmonic drives, would in this transmission range lead to very large radial extents, which is likewise undesired.

The relocation of the steering assistance means to the output shaft 19 furthermore permits a simplification, in relation to DE 20 2004 021 588 U1, of the first gear device 21 between the input shaft 18 and the output shaft 19, because in the present case, there is no longer a need for hydraulic devices in and on the steering gear. As a result, the dimensions in the direction of the axis of rotation A are reduced.

In the first exemplary embodiment, the first gear device 21, which can be clearly seen in FIGS. 3 and 4, has two gear stages 211 and 212. The first gear stage 211 serves for converting a rotational movement of the input shaft 18 about its axis of rotation A into a translational movement of an intermediate element 213. The second gear stage 212 serves for converting the translational movement of the intermediate element 213 into a rotational movement of the output shaft 19 about its axis of rotation A. The speed reduction transmission ratio of the first gear device 21 lies in the range from 1:10 to 1:40, whereby, in the case of an input-side range of rotation of 900° at the steering wheel 12, adequately large pivot angles for the actuation of the track rod linkage 16 are achieved at the steering pitman arm 13.

In the present case, the first gear stage 211 is formed by a ball screw drive. For this purpose, the input shaft 18 has a spindle section 214 which engages via balls 215 with an internal thread of the intermediate element 213. The intermediate element 213 is guided linearly on the steering gear housing 17. For this purpose, a suitable guide device 216 is provided between the intermediate element 213 and the steering gear housing 17. For example, for this purpose, longitudinal grooves may be formed on the outer circumference of the intermediate element 213 and on the inner circumference of the steering gear housing 17, which longitudinal grooves are in each case in engagement with common rollers or balls. If the input shaft 18 is rotated about the axis of rotation A, the intermediate element 213 is displaced in the longitudinal direction thereof.

The intermediate element 213 furthermore has, on its outer circumference, a toothing 217 for the second gear stage 212, which toothing engages with a toothing structure 218 formed or fastened on the drive-output shaft 19. In this way, the translational movement of the intermediate element 213 is converted into a rotational movement again, by means of which the manual torque ultimately acts on the drive-output shaft 19 with the transmission ratio of the first gear device 21.

The second gear stage 212 may be configured with a variable transmission ratio in order to make the steering of a vehicle easier for the driver. For this purpose, the toothing geometry may be modified such that steering movements at the steering wheel 12 in a range situated relatively close to the central position of the steering system that is assumed during straight-ahead travel lead to smaller wheel steer angles than steering movements in a range further remote from the central position.

The electric motor 20 is actuated in a manner dependent on a driver steering demand and possibly further vehicle parameters. In particular, the electric motor 20 may be actuated in a manner dependent on the manual torque applied to the steering wheel 12 by the driver. A corresponding control device 26 can be arranged around the output shaft 19 in a manner suited to the structural space. The manual torque can be detected by means of a torque measuring device 23, which is arranged at the input side on the input shaft 18.

In the first exemplary embodiment, the first gear device 21 is of two-stage design. It is however also possible for said first gear device to be of single-stage design, as illustrated in FIG. 7 in the context of a second exemplary embodiment. In this case, the first gear device has exactly one gear stage 21, which converts a rotational movement of the input shaft about its axis of rotation A into a rotational movement of the output shaft about its axis of rotation B. This may be realized for example, as illustrated by way of example in FIG. 7, by means of a screw drive. For this purpose, a spindle section 219 is formed on the intermediate element 213, which spindle section engages with the toothing structure 218 formed or fastened on the drive-output shaft 19. The first gear device 21 thus makes do without a translationally movable intermediate element 213, whereby the dimensions in the longitudinal direction of the axis of rotation A are further reduced.

Instead of a screw drive, it is also possible for a single-stage bevel-wheel gear or hypoid gear to be provided.

The input shaft 18 may furthermore be formed with a hollow shaft section 181 into which a torsion bar 182 extends. The torsion bar 182 is at one end connected rotationally conjointly to said hollow shaft section 181, whereas the other end of the torsion bar 182 is connected to an input-side shaft section 183, via which the manual torque is input into the steering gear 11. The spindle section 219 of the gear stage is preferably formed on or attached to the hollow shaft section 181, which is rotatably mounted axially at both sides of the spindle section 219 in the steering gear housing 17 by means of rolling bearings 24 and 25. The torque measuring device 23 in this case surrounds both a part of the hollow shaft section 181 and a part of the input-side shaft section 183. An overload protection means 184 may in this case be provided on the hollow shaft section 181.

The components discussed above, but in particular at least the input shaft 18, the output shaft 19, the first gear device 21 and at least the high-ratio coaxial gear of the second gear device 22, are accommodated in the steering gear housing. Furthermore, the electric motor 20 may also be accommodated in the steering gear housing 17. It is however also possible for said electric motor to be flange-mounted on the outside of the steering gear housing 17. It is furthermore also possible for parts of the electric motor 20, such as for example the stator thereof, to be formed by sections of the steering gear housing 17.

Furthermore, the electric motor 20 may have a stator with at least two electrically separate winding assemblies which are in each case actuated by a dedicated electronic control device, in order to increase the torque output by the electric motor 20.

A third exemplary embodiment of a steering gear 11 will now be discussed on the basis of FIG. 8 to FIG. 11. Said third exemplary embodiment is designed substantially correspondingly to the first or second exemplary embodiment, and differs from these merely through the use of a different high-ratio coaxial gear in the second gear device 22. Instead of the eccentric gear discussed above, use may be made in each case of a cycloid gear, wherein FIG. 8 illustrates two successive gear stages 221 and 222 in each case as single-stage cycloid gears.

The motor-side second gear stage 222 has an inner gearwheel 223, which on its outer circumference has an undulating contour in the form of an epicycloid. Said undulating contour partially engages with arcuate segments, in this case for example rollers 224a, provided on a ring gearwheel 224, wherein the inner gearwheel 223 can rotate between said arcuate segments in the ring gearwheel 224. The inner gearwheel is driven by 223 by a shaft shoulder 225 which is eccentric with respect to the axis of rotation of the drive-output shaft 201 of the electric motor 20, such that the inner gearwheel 223 rotates in the ring gearwheel 224.

The inner gearwheel 223 furthermore has multiple axial openings 226, which are arranged in a uniformly distributed manner in a circumferential direction. Drivers 227 of an output element 228 of the second gear stage 222 engage into the openings 226. The drivers 227 have a smaller diameter than the openings 226.

To reduce the friction, rolling bearings 227a may be arranged on the drivers 227, by means of which rolling bearings the drivers 227 engage with the openings 226. As an alternative to the rolling bearings 227a on the drivers 227, or in addition thereto, cylindrical boring bushes 226a as illustrated in FIG. 12 may be pressed into the openings 226.

If the electric motor 20 is set in operation in order to rotate its drive-output shaft 201, said drive-output shaft drives the inner gearwheel 223 concomitantly in the direction of rotation. Here, the inner gearwheel 223 rolls on the arcuate segments of the ring gearwheel 224. Here, the openings 226 drive the drivers 227 concomitantly in the circumferential direction, whereby the output element 228 rotates about the axis of rotation B.

The second gear stage 222 transmits the drive torque of the electric motor 20 to the first gear stage 221 arranged coaxially with respect thereto. In the third exemplary embodiment, said first gear stage is likewise formed as a cycloid gear, which axially directly adjoins the second gear stage 222. For this purpose, the output element 228 of the second gear stage 222 has an eccentric shaft shoulder 229 for driving the second inner gearwheel 230. The latter in turn meshes with the arcuate segments of the ring gearwheel 224 in order, by means of openings, to rotate drivers on the output element 231 of the first gear stage 221 about the axis of rotation B and thereby ultimately drive the output shaft 19. The output element of the first gear stage 221 may be formed as a disk-shaped carrier, from which the drivers project axially in the direction of the openings of the inner gearwheel 230 of the first gear stage 221. The output element 231 is formed integrally with the output shaft 219, on which the toothing 218 of the first gear device 21 is also formed. However, the output element 231 may also be connected to the output shaft 19 in some other way.

Alternatively, the arcuate segments, for example rollers or cylindrical pins, may also roll on an inner contour in the form of a hypocycloid.

Furthermore, it is also possible here for boring bushes 226a to be provided instead of or in addition to the rolling bearings 227a.

Such a two-stage second gear device 22 may, like the eccentric gear with involute toothing discussed above, be used with a transmission ratio in the range from 1:18 to 1:25 per gear stage. Furthermore, such a second gear device 22 may be modified as described in conjunction with the first exemplary embodiment.

FIG. 4 shows a fourth exemplary embodiment, in which the electric motor 20 is arranged axially parallel with respect to the axis of rotation B of the output shaft 19. The drive torque of the electric motor 20 is in this case transmitted via a belt drive 27 to an input element of a high-ratio coaxial gearing which is arranged coaxially with respect to the output shaft 19 and which is coupled in terms of drive to said output shaft.

Here, the belt drive 27 may replace the second gear stage 222 of the second gear device 22, such that only one gear stage in the form of a single-stage, high-ratio coaxial gear remains on the output shaft 19. As a result of the offset of the electric motor 20, the length of the steering gear 11 in the direction of the axis of rotation B is shortened. By means of a belt drive 27, the electric motor 20 can be positioned in accordance with requirements and around the axis of rotation B, whereby easy adaptation to different spatial conditions is made possible.

Instead of a belt drive 27, the electric motor 20 may however also be connected for example via a bevel-wheel gear or hypoid gear to an input element of a single-stage, high-ratio coaxial gear.

The single-stage, high-ratio coaxial gear at the output shaft may for example be an eccentric gear or a cycloid gear, for example with a transmission ratio of i=97, whereas the second gear stage, which is of a different type and is connected upstream, has a considerably lower transmission ratio of i=5. In this way, an overall speed reduction transmission ratio of i=485 can be realized in order to achieve a drive-output torque of for example approximately 8100 Nm.

It is furthermore possible for a coaxial gear stage such as for example a planetary gear to be connected upstream of the first gear stage 221 on the drive-output shaft 19. With a gear stage connected upstream, the single-stage, high-ratio coaxial gear can be designed with a higher transmission ratio. This means that, for example in the case of a cycloid gear, a significantly greater number of arcuate segments, that is to say rollers, cylindrical pins, needles or the like, accommodate forces, which results in a lengthening of the service life.

In general, it is thus possible in the context of the fourth exemplary embodiment for the second gear device 22 to have an additional gear stage 27 between the electric motor 20 and the high-ratio coaxial gear, wherein the high-ratio coaxial gear 2221 has a speed reduction transmission ratio of greater than 1:80, and the additional gear stage 27 connected upstream thereof has a speed reduction transmission ratio of less than 1:10.

It has been found that, with such an arrangement, a particularly compact utility vehicle steering system can be realized which permits the provision of high torques by means of an electromotive drive in a restricted structural space.

The invention makes it possible to realize a utility vehicle steering system in which the power assistance can be realized purely electrically by means of a single electric motor 20. Here, with an on-board electrical system voltage of 24 V, torques in the range of approximately 8000 Nm can be provided at the steering pitman arm 13, whereby utility vehicles with front-axle loads of greater than 2.5 t can be steered.

The invention has been discussed in more detail above on the basis of various exemplary embodiments and further modifications. In particular, technical individual features that have been discussed above in the context of further individual features may be realized independently of these and in combination with further individual features, even if this is not expressly described, as long as this is technically possible. The invention is therefore explicitly not restricted to the described exemplary embodiments, but rather encompasses all refinements defined by the patent claims.

LIST OF REFERENCE SYMBOLS

10 Steering system
11 Steering gear
12 Steering wheel
13 Steering pitman arm
14 Steering column
15 Track rod linkage
16 Vehicle wheel
17 Steering gear housing
18 Input shaft
181 Hollow shaft section
182 Torsion bar
183 Input-side shaft section
184 Overload protection means
19 Output shaft
20 Electric motor
201 Drive-output shaft
21 First gear device
211 First gear stage of the first gear device
212 Second gear stage of the first gear device
213 Intermediate element
214 Spindle section
216 Linear guide device
217 Toothing
218 Toothing structure
219 Spindle section
22 Second gear device
221 First gear stage of the second gear device
222 Second gear stage of the second gear device
223 Inner gearwheel
224 Ring gearwheel
224a Roller
225 Eccentric shaft section
226 Opening
226a Cylindrical boring bush
227 Driver
227a Rolling bearing
228 Output element of the second gear stage
229 Eccentric shaft shoulder
230 Inner gearwheel
231 Output element of the first gear stage
24 Bearing
25 Bearing
26 Torque measuring device
A Axis of rotation of the input shaft
B Axis of rotation of the output shaft

The invention claimed is:
1. A utility vehicle steering system, comprising:
a steering gear for transmitting a manual torque applied to a steering wheel to a steering pitman arm;
said steering gear having:
an electric motor for providing an auxiliary torque for a steering assistance, the steering assistance being provided exclusively electrically over an entire operating range of the steering system;
an input shaft and an output shaft with axes of rotation that are skewed relative to one another;

a first gear device disposed to couple said input shaft to said output shaft; and a second gear device having an input side connected to said electric motor and having at least one speed reduction gear stage being a high-ratio coaxial gear, said second gear device having an output side coupled to said output shaft, and said high-ratio coaxial gear of said at least one speed reduction gear stage being arranged coaxially with respect to said output shaft.

2. The utility vehicle steering system according to claim 1, wherein said at least one gear stage that is coaxial with respect to said output shaft is an eccentric gear with toothing, an eccentric gear with involute toothing, or a cycloid gear.

3. The utility vehicle steering system according to claim 1, wherein said second gear device has two gear stages each being a speed reduction gear stage in the form of a high-ratio coaxial gear.

4. The utility vehicle steering system according to claim 3, wherein said two gear stages of said second gear device are eccentric gears or cycloid gears, and wherein, for said gear stages, a common ring gearwheel is disposed to mesh with inner discs of said two gear stages.

5. The utility vehicle steering system according to claim 3, wherein said two gear stages of said second gear device have a substantially identical transmission ratio, in each case in a range from 1:18 to 1:25.

6. The utility vehicle steering system according to claim 1, wherein said electric motor is arranged coaxially with respect to said output shaft.

7. The utility vehicle steering system according to claim 1, wherein said second gear device comprises a further gear stage selected from a group consisting of a speed reduction belt drive, a planetary gear, a bevel-wheel gear and a hypoid gear disposed between said electric motor and said high-ratio coaxial gear.

8. The utility vehicle steering system according to claim 1, wherein said second gear device comprises an additional gear stage between said electric motor and said high-ratio coaxial gear, wherein said high-ratio coaxial gear has a speed reduction transmission ratio of greater than 1:60 and said additional gear stage, connected upstream thereof, has a speed reduction transmission ratio of less than 1:8.

9. The utility vehicle steering system according to claim 1, which comprises a toothing structure, forming a constituent part of said first gear device, fastened or formed on said output shaft.

10. The utility vehicle steering system according to claim 1, wherein said first gear device has two gear stages, including a first gear stage for converting a rotational movement of said input shaft about the axis of rotation thereof into a translational movement of an intermediate element, and a second gear stage for converting the translational movement of said intermediate element into a rotational movement of said output shaft about the axis of rotation thereof, and wherein a speed reduction transmission ratio of said first gear device lies in a range from 1:10 to 1:40.

11. The utility vehicle steering system according to claim 1, wherein said first gear device has exactly one gear stage configured to convert a rotational movement of said input shaft about the axis of rotation thereof into a rotational movement of said output shaft about the axis of rotation thereof.

12. The utility vehicle steering system according to claim 11, wherein said single gear stage of said first gear device is a device selected from a group consisting of a screw drive, a bevel-wheel gear and a hypoid gear.

13. The utility vehicle steering system according to claim 1, which further comprises a torque measuring device disposed on said input shaft at the input side.

14. The utility vehicle steering system according to claim 1, which further comprises a steering gear housing accommodating said input shaft, said output shaft, said first gear device and at least said high-ratio coaxial gear of said second gear device.

15. The utility vehicle steering system according to claim 14, wherein said electric motor is accommodated in said steering gear housing.

16. The utility vehicle steering system according to claim 14, wherein parts of said electric motor are formed by sections of said steering gear housing.

17. The utility vehicle steering system according to claim 1, wherein said electric motor has a stator with at least two electrically separate winding assemblies, each configured for actuation by a respectively dedicated electronic control device.

18. The utility vehicle steering system according to claim 1, wherein said electric motor is a single electric motor configured to exclusively provide the steering assistance over the entire operating range.

19. The utility vehicle steering system according to claim 1, wherein the steering assistance is provided exclusively electrically over the entire operating range.

20. The utility vehicle steering system according to claim 1, wherein said gear stage engaging said first gear device on said output shaft has a variable transmission ratio so that, in a range that is relatively close to a central position of the steering arrangement, steering movements at the steering wheel give rise to smaller wheel steer angles than steering movements in a range further remote from the central position.

* * * * *